(12) United States Patent
Sun

(10) Patent No.: US 11,100,474 B2
(45) Date of Patent: Aug. 24, 2021

(54) MOBILE PAYMENT PROCESSING

(71) Applicant: Advanced New Technologies Co., Ltd., Grand Cayman (KY)

(72) Inventor: Yuanbo Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/725,913

(22) Filed: Dec. 23, 2019

(65) Prior Publication Data

US 2020/0134575 A1 Apr. 30, 2020

Related U.S. Application Data

(63) Continuation of application No. 16/205,839, filed on Nov. 30, 2018, which is a continuation of application No. PCT/CN2017/085283, filed on May 22, 2017.

(30) Foreign Application Priority Data

Jun. 1, 2016 (CN) .......................... 201610383679.6

(51) Int. Cl.
*G06Q 20/02* (2012.01)
*G06Q 20/32* (2012.01)
(Continued)

(52) U.S. Cl.
CPC ........... *G06Q 20/02* (2013.01); *G06Q 20/223* (2013.01); *G06Q 20/32* (2013.01);
(Continued)

(58) Field of Classification Search
CPC ...... G06Q 20/02; G06Q 20/363; G06Q 20/40; G06Q 20/223; G06Q 20/3223;
(Continued)

(56) References Cited

U.S. PATENT DOCUMENTS 8,924,267 B1 * 12/2014 Terranova ........... G07F 17/0014
705/35
2007/0067620 A1 * 3/2007 Jevans .................... H04L 9/321
713/156
(Continued)

FOREIGN PATENT DOCUMENTS

CN  101149826  3/2008
CN  101482950  7/2009
(Continued)

OTHER PUBLICATIONS

G. Me, M. A. Strangio and A. Schuster, "Mobile Local Macropayments: Security and Prototyping," in IEEE Pervasive Computing, vol. 5, No. 4, pp. 94-100, Oct.-Dec. 2006, doi: 10.1109/MPRV.2006.78. (Year: 2006).*

(Continued)

*Primary Examiner* — Bennett M Sigmond
*Assistant Examiner* — Bolko M Hamerski
(74) *Attorney, Agent, or Firm* — Fish & Richardson P.C.

(57) ABSTRACT

The present specification relates to a mobile payment method, device, and system. One example method includes enabling, by the payee device, a device authorization function using a third-party server; receiving, by the payee device, identity authentication information from a payor device, wherein the identity authentication information includes an identifier of the payor device, and wherein the payor device does not have a payment application (APP) installed; forwarding, by the payee device, the received identity authentication information to the third-party server; receiving, by the payee device, token information from the third-party server, wherein the token information corresponds to the identifier; receiving, by the payee device, a payment request from the payor device, wherein the payment request includes the identifier of the payor device and the generated token; and sending, by the payee device, (Continued)

payment information including the generated token and the to the third-party server for verification.

9 Claims, 11 Drawing Sheets

(51) Int. Cl.
    *G06Q 20/38*     (2012.01)
    *G06Q 20/40*     (2012.01)
    *G06Q 20/36*     (2012.01)
    *G06Q 20/22*     (2012.01)

(52) U.S. Cl.
    CPC ..... *G06Q 20/3223* (2013.01); *G06Q 20/3278* (2013.01); *G06Q 20/363* (2013.01); *G06Q 20/385* (2013.01); *G06Q 20/40* (2013.01); *G06Q 20/40145* (2013.01)

(58) Field of Classification Search
    CPC ............... G06Q 20/32; G06Q 20/3278; G06Q 20/40145; G06Q 20/385
    See application file for complete search history.

(56) References Cited

U.S. PATENT DOCUMENTS

| | | | | |
|---|---|---|---|---|
| 2007/0203836 | A1* | 8/2007 | Dodin | G06Q 20/02 705/44 |
| 2014/0143144 | A1* | 5/2014 | DuCharme | G06Q 20/3821 705/44 |
| 2014/0358786 | A1* | 12/2014 | Van Heerden | G06Q 20/351 705/44 |
| 2015/0074764 | A1* | 3/2015 | Stern | H04L 9/3247 726/4 |
| 2015/0269559 | A1* | 9/2015 | Inotay | G06Q 20/3274 705/44 |
| 2015/0312038 | A1 | 10/2015 | Palanisamy | |

FOREIGN PATENT DOCUMENTS

| | | |
|---|---|---|
| CN | 102289754 | 12/2011 |
| CN | 103392186 | 11/2013 |
| CN | 103443814 | 12/2013 |
| CN | 105160526 | 12/2015 |
| CN | 105550869 | 5/2016 |
| CN | 105608563 | 5/2016 |
| CN | 105608569 | 5/2016 |
| JP | 2008033789 | 2/2008 |
| JP | 2008107874 | 5/2008 |
| JP | 2013539561 | 10/2013 |
| JP | 2014112286 | 6/2014 |
| KR | 20090015469 | 2/2009 |
| KR | 20090090426 | 8/2009 |
| KR | 20120094401 | 8/2012 |
| KR | 20160021175 | 2/2016 |
| TW | 201405456 | 2/2014 |
| WO | WO 03038698 | 5/2003 |
| WO | WO 2009112793 | 9/2009 |
| WO | WO 2015162276 | 10/2015 |
| WO | WO 2016059486 | 10/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.

European Extended Search Report in European Patent Application No. 17805692.5, dated May 22, 2019, 8 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/085283, dated Dec. 4, 2018, 9 pages (with English Translation).

PCT International Search Report by the International Searching Authority issued in International Application No. PCT/CN2017/085283 dated Aug. 11, 2017; 8 pages.

PCT Written Opinion in International Application No. PCT/CN2017/085283, dated Aug. 11, 2017, 9 pages (with English Translation).

\* cited by examiner

MOBILE PAYMENT PROCESSING

CROSS-REFERENCE TO RELATED APPLICATIONS

This application is a continuation of U.S. patent application Ser. No. 16/205,839, filed Nov. 30, 2018, which is a continuation of PCT Application No. PCT/CN2017/085283, filed on May 22, 2017, which claims priority to Chinese Patent Application No. 201610383679.6, filed on Jun. 1, 2016, and each application is hereby incorporated by reference in its entirety.

TECHNICAL FIELD

The present disclosure relates to the field of electronic financial technologies, and in particular, to a mobile payment method, device, and system.

BACKGROUND

With the development and popularization of mobile technologies, mobile payment gradually becomes an emerging electronic payment service mode, and mobile payment is also referred to as smartphone payment. Mobile payment is a service method that allows mobile users to use their mobile devices (usually mobile phones) to perform a payment for merchandises or services. Compared with conventional electronic payment based on the Internet, mobile payment is more flexible, timely, customized, convenient, and with many other characteristics. During mobile payment transaction, fund processing systems such as the bank counter and the cashiering platform can be directly pushed to the user, so that the user can trade with various targets anytime anywhere using the mobile device.

Currently, mobile payment is completed by using a payment application (APP) installed in the mobile device, that is, the user needs to send payment request information to a financial server by using the payment APP in the mobile device when performing financial payment. For example, the payment request information is sent by using ALIPAY or WECHAT in the mobile device, and the financial server performs a corresponding operation on a user account included in the payment request information after receiving the payment request information. Currently, mobile payment cannot be completed without installing the payment APP.

SUMMARY

In view of the previously described problem, the present disclosure is proposed to provide a mobile payment method, device, and system for resolving the problem or at least partially resolving the problem.

To achieve the previous objective, the present disclosure mainly provides the technical solutions below.

According to one aspect, an implementation of the present disclosure provides a mobile payment method, and the method includes the following: receiving payment information sent by a second mobile device, where the payment information includes first mobile device identifier information, an account corresponding to a payment APP currently running in the second mobile device, and a payment amount corresponding to the first mobile device identifier information, the first mobile device identifier information is sent by a first mobile device to the second mobile device, and no payment APP is installed in the first mobile device; and obtaining account information corresponding to the first mobile device identifier information, so that the payment amount can be transferred from an account corresponding to the first mobile device identifier information to the account corresponding to the payment APP currently running in the second mobile device.

According to another aspect, an implementation of the present disclosure further provides a mobile payment method, and the method includes: receiving a payment request sent by a first mobile device, where the payment request includes first mobile device identifier information; and sending payment information to a third-party server, where the payment information includes the first mobile device identifier information, an account corresponding to a payment APP currently running in a second mobile device, and a payment amount corresponding to the first mobile device identifier information, so that the third-party server obtains account information corresponding to the first mobile device identifier information, and the payment amount can be transferred from an account corresponding to the first mobile device identifier information to the account corresponding to the payment APP currently running in the second mobile device.

According to still another aspect, an implementation of the present disclosure further provides a mobile payment device, and the mobile payment device includes: a receiving unit, configured to receive payment information sent by a second mobile device, where the payment information includes first mobile device identifier information, an account corresponding to a payment APP currently running in the second mobile device, and a payment amount corresponding to the first mobile device identifier information, the first mobile device identifier information is sent by a first mobile device to the second mobile device, and no payment APP is installed in the first mobile device; and an acquisition unit, configured to obtain account information corresponding to the first mobile device identifier information, so that the payment amount can be transferred from an account corresponding to the first mobile device identifier information to the account corresponding to the payment APP currently running in the second mobile device.

According to yet another aspect, an implementation of the present disclosure further provides a mobile payment device, and the mobile payment device includes: a receiving unit, configured to receive a payment request sent by a first mobile device, where the payment request includes first mobile device identifier information, and no payment APP is installed in the first mobile device; and a sending unit, configured to send payment information to a third-party server, where the payment information includes the first mobile device identifier information, an account corresponding to a payment APP currently running in a second mobile device, and a payment amount corresponding to the first mobile device identifier information, so that the third-party server obtains account information corresponding to the first mobile device identifier information, and the payment amount can be transferred from an account corresponding to the first mobile device identifier information to the account corresponding to the payment APP currently running in the second mobile device.

An implementation of the present disclosure further provides a mobile payment system, and the mobile payment system includes a first mobile device, a second mobile device, and a third-party server. The first mobile device is configured to send a payment request to the second mobile device, where the payment request includes first mobile device identifier information, and no payment APP is installed in the first mobile device; the second mobile device is configured to send payment information to the third-party server, where the payment information includes the first mobile device identifier information, an account corresponding to a payment APP currently running in the second mobile device, and a payment amount corresponding to the first mobile device identifier information; and the third-party server is configured to obtain account information corresponding to the first mobile device identifier information, so that the payment amount can be transferred from an account corresponding to the first mobile device identifier information to the account corresponding to the payment APP currently running in the second mobile device.

Based on the previous technical solutions, the technical solutions provided in the implementations of the present disclosure have at least the advantages below.

According to the mobile payment method, device, and system provided in the implementations of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in the implementations of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in the implementations of the present disclosure can also complete mobile payment when no payment APP is installed in the first mobile device.

BRIEF DESCRIPTION OF DRAWINGS

It becomes clear for a person skilled in the art to learn various other advantages and benefits by reading detailed description of the following preferred implementations. Accompanying drawings are merely used for showing the preferred implementations, but not considered as a limitation on the present invention. In all accompanying drawings, a same reference symbol is used to indicate a same part. In the accompanying drawings.

DESCRIPTION OF IMPLEMENTATIONS

Implementations of the present disclosure that are used as examples are described in more detail with reference to the accompanying drawings. Although the accompanying drawings show the implementations of the present disclosure that are used as examples, it should be understood that the present disclosure can be implemented in various forms, and shall not be limited by the implementations described here. On the contrary, these implementations are provided for clearer understanding of the present disclosure, and to completely convey the scope of the present disclosure to the person skilled in the art.

To make the advantages of the technical solutions in the present disclosure clearer, the following describes the present disclosure in detail with reference to the accompanying drawings and the implementations.

Figure 1:
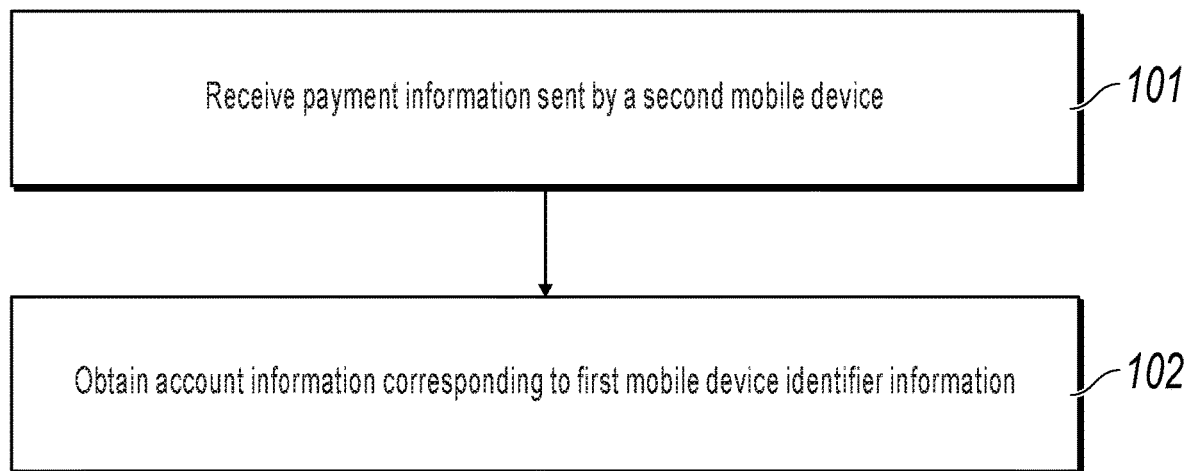
FIG. 1 is a flowchart illustrating a mobile payment method, according to an implementation of the present disclosure.

An implementation of the present disclosure provides a mobile payment method, and the method is applied to a third-party server. As shown in FIG. 1, the method includes the following steps.

101. Receive payment information sent by a second mobile device.

The payment information includes first mobile device identifier information, an account corresponding to a payment APP currently running in the second mobile device, and a payment amount corresponding to the first mobile device identifier information. No payment APP is installed in a first mobile device. The account corresponding to the payment APP currently running in the second mobile device can be a registered account entered when a user logs in to the payment APP by using the second mobile device. In this implementation of the present disclosure, the payment APP can be ALIPAY, WECHAT, etc., and is not limited in this implementation of the present disclosure. In this implementation of the present disclosure, the first mobile device and the second mobile device can be a personal computer (PC), a tablet computer, a smartphone, a personal digital assistant (PDA), a portable computer, an in-vehicle computer, etc. The first mobile device and the second mobile device are not limited in this implementation of the present disclosure.

In this implementation of the present disclosure, the first mobile device and the second mobile device in the present disclosure are devices authenticated by the Internet Finance Authentication Alliance (IFAA) or the Authority by using a public key infrastructure (PKI) system, that is, a certificate authenticated by using the previous method is stored in security zones of the first mobile device and the second mobile device, and the certificate is sent to a third-party server for identity authentication. The first mobile device identifier information is used to uniquely identify the first mobile device. The first mobile device identifier information can be a unique hardware code of the first mobile device, or a certificate of the first mobile device.

It is worthwhile to note that the first mobile device identifier information is sent by the first mobile device to the second mobile device, and the first mobile device can send the first mobile device identifier information to the second mobile device through Bluetooth, scanning, near field communication (NFC), or other communications technologies, which is not limited in this implementation of the present disclosure. In this implementation of the present disclosure, the first mobile device sends the first mobile device identifier information to the second mobile device through Bluetooth, scanning, NFC, or other communications technologies, so that the first mobile device can perform a payment to the second mobile device without network access.

In this implementation of the present disclosure, the second mobile device is a terminal with a device authorization function that has been authenticated, and identity authentication on the second mobile device is implemented by using the third-party server. The third-party server is a server corresponding to the payment APP currently running in the second mobile device. For example, the second mobile device can send payment information of the first mobile device to an ALIPAY server only after an ALIPAY APP in the second mobile device is authenticated by the ALIPAY server. The third-party server can authenticate the second mobile device by using a device certificate of the second mobile device.

102. Obtain account information corresponding to first mobile device identifier information.

Further, the payment amount can be transferred from an account corresponding to the first mobile device identifier information to the account corresponding to the payment APP currently running in the second mobile device. A process of transferring the payment amount from the account corresponding to the first mobile device identifier information to the account corresponding to the payment APP currently running in the second mobile device can include the following: sending the account information corresponding to the first mobile device identifier information and the payment information to a financial server first, and then using the financial server to transfer an amount corresponding to a first terminal account to the account of the payment application APP currently running in the second mobile device. It is worthwhile to note that if the account corresponding to the first mobile device identifier information and the account corresponding to the payment APP currently running in the second mobile device belong to a same payment APP account such as an ALIPAY account, the ALIPAY server first obtains the account information corresponding to the first mobile device identifier information after receiving the payment information, and then transfers the payment amount from the account corresponding to the first mobile device identifier information to the account corresponding to the payment APP currently running in the second mobile device. If the account corresponding to the obtained first mobile device identifier information is a bank account, the third-party server sends the payment information and the account information corresponding to the first mobile device identifier information to a corresponding bank after receiving the payment information and obtaining the account information corresponding to the first mobile device identifier information, so that the corresponding bank transfers the payment amount from the account corresponding to the first mobile device identifier information to the account corresponding to the payment APP currently running in the second mobile device.

In this implementation of the present invention, the third-party server stores multiple pieces of account information, and the account information can be a financial account such as a bank account, an ALIPAY account, or a YU'E BAO account. Each piece of account information corresponds to one piece of first mobile device identifier information. Therefore, after receiving the payment information sent by the second mobile device, the third-party server can search the third-party server for the corresponding account information based on the first mobile device identifier information in the payment information. After the corresponding account information is obtained, the payment amount can be transferred from the account corresponding to the first mobile device identifier information to the account corresponding to the payment APP currently running in the second mobile device.

It is worthwhile to note that the account information stored in the third-party server can be obtained based on historical payment information of the first mobile device, or can be actively provided by the first mobile device for the third-party server, or can be forwarded by the second mobile device, which is not limited in this implementation of the present disclosure. For example, the ALIPAY server automatically stores the account information of the user and the corresponding first mobile device identifier information after the user performs financial payment by using the ALIPAY APP installed in the first mobile device. Therefore, when the user performs mobile payment again, even if the user uninstalls the payment APP in the first mobile device, the third-party server can obtain the corresponding account information based on the first mobile device identifier information.

For another example, after third-party server receives the payment information sent by the second mobile device, if the account information corresponding to the first mobile device identifier information is not found in the third-party server, the third-party server sends, to the second mobile device, prompt information indicating that the account corresponding to the first mobile device does not exist, to prompt the user of the first mobile device to provide the corresponding account information. After receiving the prompt information, the user of the first mobile device can actively send the account information to the third-party server, or can send the account information to the second mobile device through Bluetooth, scanning, NFC, or other communications technologies, and then the second mobile device forwards the account information of the first mobile device to the third-party server. It is worthwhile to note that, regardless of how the third-party server obtains the first mobile device identifier information and the account information, the third-party server correspondingly stores the account information of the first mobile device and the first mobile device identifier information after obtaining the first mobile device identifier information and the account information, so that the third-party server directly obtains the account information corresponding to the first mobile device identifier information from the account information stored in the third-party server when the first mobile device performs mobile payment again.

In this implementation of the present disclosure, the first mobile device is a terminal with a device authorization function authenticated by the third-party server. Therefore, when the first mobile device performs a payment to the second mobile device, the first mobile device can first send the first mobile device identifier information to the second mobile device through Bluetooth, scanning, NFC, or other communications technologies, and then the second mobile device sends the payment information to the third-party server. The payment information includes the first mobile device identifier information, the account corresponding to the payment APP currently running in the second mobile device, and the payment amount corresponding to the first mobile device identifier information. The third-party server obtains the account information corresponding to the first mobile device identifier information after receiving the payment information, so that the payment amount can be transferred from the account corresponding to the first mobile device identifier information to the account corresponding to the payment APP currently running in the second mobile device. In the previously described process, it can be seen that the first mobile device only needs to send the first mobile device identifier information to the second mobile device when performing a payment to the second mobile device. Therefore, in this implementation of the present disclosure, the first mobile device can also perform mobile payment when no payment APP is installed in the first mobile device.

According to the mobile payment method provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 2:
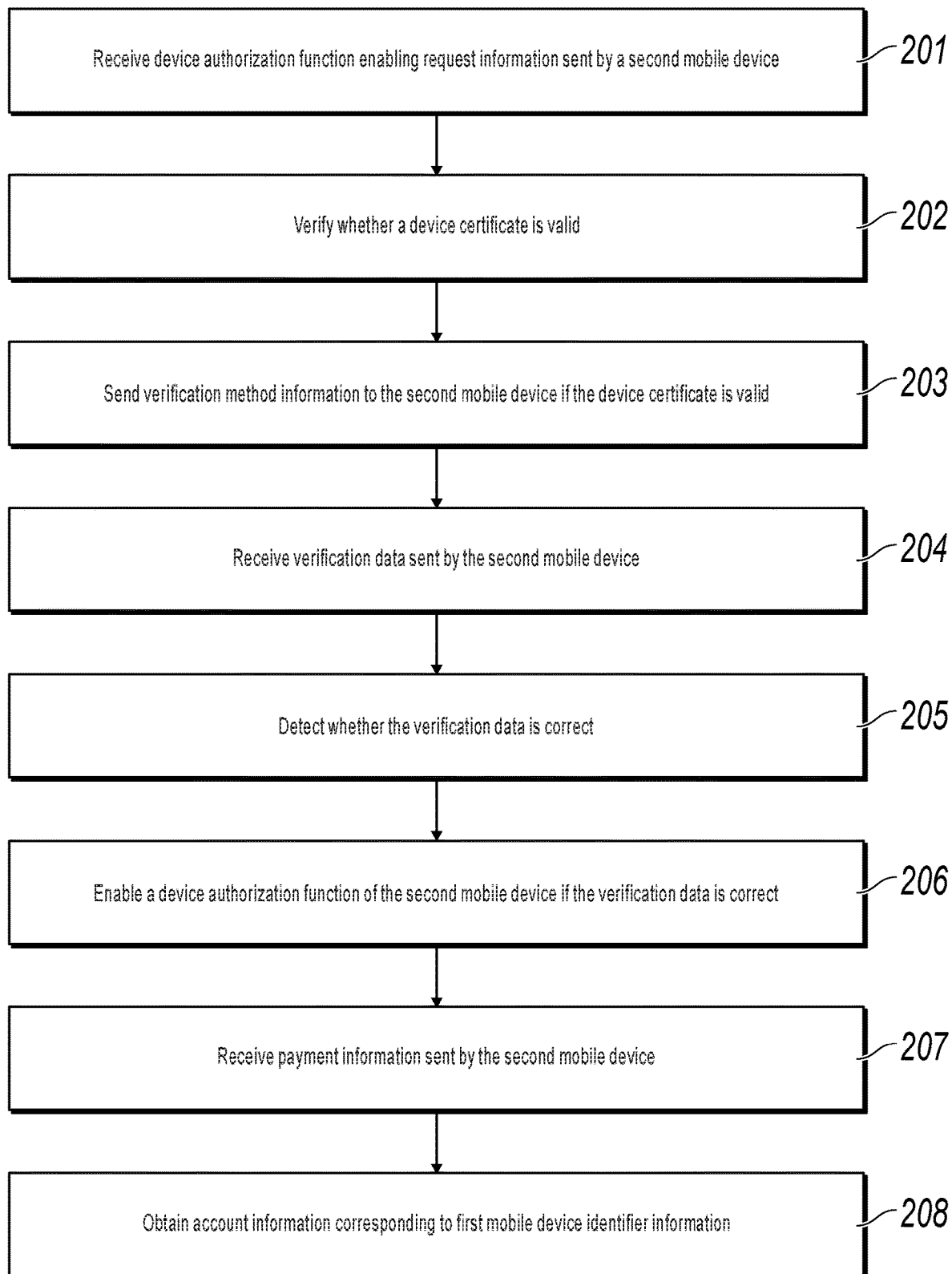
FIG. 2 is a flowchart illustrating another mobile payment method, according to an implementation of the present disclosure.

An implementation of the present disclosure provides another mobile payment method, and the method is applied to a third-party server. As shown in FIG. 2, the method includes the following steps.

201. Receive device authorization function enabling request information sent by a second mobile device.

The device authorization function enabling request information includes a device certificate of the second mobile device, and the second mobile device is a device authenticated by the IFAA or the Authority by using a PKI system, that is, a certificate authenticated by using the previous method is stored in a security zone of the second mobile device, and the certificate is sent to the third-party server for identity authentication. In this implementation of the present disclosure, the device certificate of the second mobile device is a certificate stored in the security zone of the second mobile device.

202. Verify whether a device certificate is valid.

In this implementation of the present disclosure, whether the device certificate is valid can be verified by determining whether a corresponding device certificate exists in the third-party server. If the corresponding device certificate exists in the third-party server, it is verified that the device certificate is valid; or if no corresponding device certificate exists in the third-party server, it is verified that the device certificate is invalid.

203. Send verification method information to the second mobile device if the device certificate is valid.

Further, the second mobile device obtains verification data based on the verification method information. The verification method information can be face verification, certificate verification, handwriting verification, voiceprint verification, eyeprint verification, etc., and is not limited in this implementation of the present disclosure. In this implementation of the present disclosure, the second mobile device outputs verification method prompt information after receiving the verification method information sent by the third-party server, to prompt a user to input the corresponding verification data. For example, if the received verification method information is certificate verification and voiceprint verification, certificate verification prompt information and voiceprint verification prompt information are first output, and then certificate data and voice data that are input by a user of the second mobile device are received.

In this implementation of the present disclosure, after it is verified that the device certificate is valid, the method further includes the following: obtaining account credit information corresponding to the second mobile device, where the credit information is used to evaluate credit of the second mobile device; and detecting whether the account credit information corresponding to the second mobile device exceeds a predetermined threshold. The sending verification method information to the second mobile device includes the following: sending the verification method information to the second mobile device if the account credit information corresponding to the second mobile device exceeds the predetermined threshold. The account credit information corresponding to the second mobile device is used to evaluate the credit of the second mobile device. The credit information can be Sesame Credit in ALIPAY, and the predetermined threshold can be set based on an actual requirement. The predetermined threshold can be 700, 800, 900, etc., and is not limited in this implementation of the present disclosure. In this implementation of the present disclosure, because payment information sent by the second mobile device to the third-party server is actually financial payment made by a first mobile device to the second mobile device, the verification method information is sent to the second mobile device when the account credit information corresponding to the second mobile device exceeds the predetermined threshold, to ensure security of payment by the first mobile device.

204. Receive verification data sent by the second mobile device.

205. Detect whether the verification data is correct.

206. Enable a device authorization function of the second mobile device if the verification data is correct.

It is worthwhile to note that, the second mobile device can send the payment information to the third-party server only after the device authorization function of the second mobile device is enabled. In this implementation of the present disclosure, after step 206, the method further includes the following: sending enabling information of the second mobile device to the second mobile device, so that the second mobile device confirms the enabling information. In this implementation of the present disclosure, the enabling information of the second mobile device is sent to the second mobile device, to notify a user of the second mobile device that the device authorization function of the current device has been enabled. In this case, the second mobile device can send the payment information to the third-party server.

In this implementation of the present disclosure, after the enabling information of the second mobile device is sent to the second mobile device, the method further includes the following: receiving first mobile device identity authentication information sent by the second mobile device, where the first mobile device identity authentication information includes first mobile device identifier information; generating token information corresponding to the first mobile device identifier information; and sending the token information to the second mobile device. The first mobile device identifier information can be a unique hardware code of the first mobile device, or a certificate of the first mobile device, and is not limited in this implementation of the present disclosure.

207. Receive payment information sent by the second mobile device.

The payment information includes the first mobile device identifier information, an account corresponding to a payment APP currently running in the second mobile device, and a payment amount corresponding to the first mobile device identifier information. No payment APP is installed in the first mobile device.

In this implementation of the present disclosure, the first mobile device identifier information is sent by the first mobile device to the second mobile device, and the first mobile device can send the first mobile device identifier information to the second mobile device through Bluetooth, scanning, NFC, or other communications technologies, which is not limited in this implementation of the present disclosure. In this implementation of the present disclosure, the first mobile device sends the first mobile device identifier information to the second mobile device through Bluetooth, scanning, NFC, or other communications technologies, so that the first mobile device can perform a payment to the second mobile device without network access.

208. Obtain account information corresponding to first mobile device identifier information.

Further, the payment amount can be transferred from an account corresponding to the first mobile device identifier information to the account corresponding to the payment APP currently running in the second mobile device.

In this implementation of the present disclosure, before step 208, the method further includes the following: separately verifying whether the token information and a device certificate of the first mobile device are correct. The obtaining account information corresponding to the first mobile device identifier information includes the following: obtaining the account information corresponding to the first mobile device identifier information if it is verified that both the token information and the device certificate of the first mobile device are correct. Separately verifying whether the token information and the device certificate of the first mobile device are correct is searching the third-party server to determine whether the corresponding token information and the device certificate of the first mobile device exist. If the corresponding token information and the device certificate of the first mobile device exist in the third-party server, it is verified that both the token information and the device certificate of the first mobile device are correct.

It is worthwhile to note that, the third-party server stores the token information only for a short time after generating the token information based on the first mobile device identifier information. For example, if the token information is generated at 14:00, and the token information can be stored in the third-party server for three minutes, token information generated after 14:03 is automatically deleted from the third-party server. In this implementation of the present disclosure, the account information corresponding to the first mobile device identifier information is obtained when it is verified that both the token information and the device certificate of the first mobile device are correct, to ensure security of payment by the first mobile device.

In this implementation of the present disclosure, after the account information corresponding to the first mobile device identifier information is obtained, the method further includes the following: sending prompt information indicating successful payment by the first mobile device payment to the second mobile device, if the payment amount is successfully transferred from the account corresponding to the first mobile device identifier information to the account corresponding to the payment APP currently running in the second mobile device.

Figure 10:
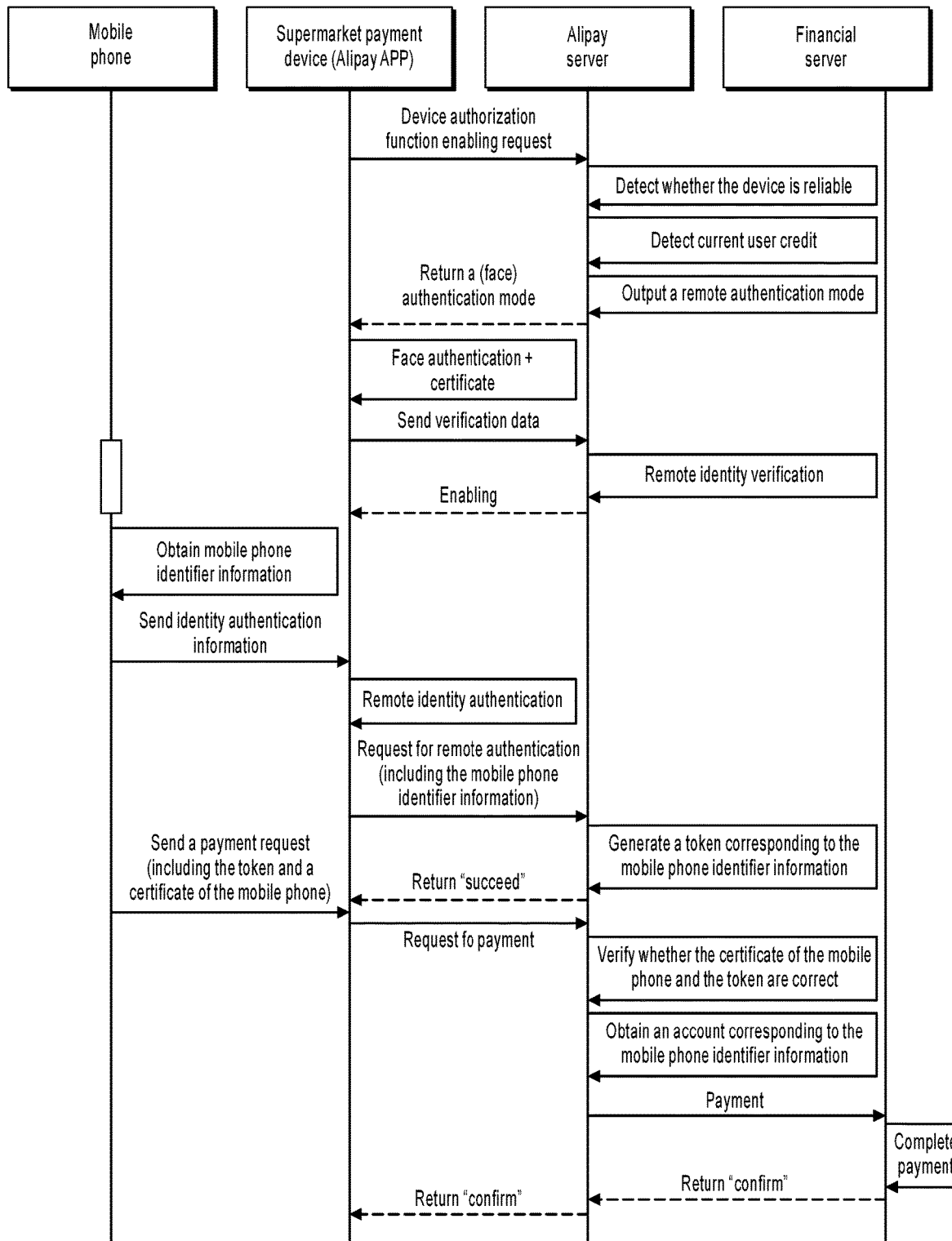
FIG. 10 is a schematic diagram illustrating a mobile payment application scenario, according to an implementation of the present disclosure.

In this implementation of the present disclosure, as shown in FIG. 10, an application scenario includes but is not limited to the following case: An ALIPAY APP is installed in a supermarket payment device, but no payment APP is installed in a mobile phone. If a user needs to perform a payment by using the mobile phone, the supermarket payment device first needs to send a device authorization function enabling request to an ALIPAY server. The ALIPAY server verifies a certificate of the supermarket payment device after receiving the request. If the verification succeeds, the ALIPAY server detects whether credit corresponding to the supermarket payment device exceeds a predetermined threshold, and sends face authentication method information to the supermarket payment device if the credit exceeds the predetermined threshold. The supermarket payment device sends a face image and the certificate to the ALIPAY server after receiving the face authentication method information. Then the ALIPAY server verifies whether the face image and the certificate are correct, and sends prompt information indicating successful device authorization function enablement to the supermarket payment device if the verification succeeds, to notify a supermarket staff that the current supermarket payment device can forward a payment request of the mobile phone.

When the user of the mobile phone needs to perform a payment for merchandises, the user first needs to obtain a token corresponding to the current payment request and send the payment request to the supermarket payment device. The supermarket payment device sends the payment information to the ALIPAY server after receiving the payment request, where the payment information includes identifier information of the mobile phone, a certificate of the mobile phone, the token corresponding to the current payment request, an account corresponding to a payment APP currently running in the supermarket payment device, and a payment amount corresponding to the mobile phone. The ALIPAY server verifies whether the certificate of the mobile phone and the token corresponding to the current payment request are correct after receiving the payment information. If it is verified that both the certificate of the mobile phone and the token corresponding to the current payment request are correct, the ALIPAY server obtains an account corresponding to identifier information of the mobile phone, and send the payment information and the amount corresponding to the mobile phone to a finance server, so that the finance server can transfer the payment amount from the account corresponding to the first mobile device identifier information to the account corresponding to the payment APP currently running in the second mobile device.

In this application scenario, a process of obtaining the token corresponding to the current payment request is as follows: The identifier information of the mobile phone needs to be obtained first, and then identity authentication information is sent the supermarket payment device, where the identity authentication information includes the identifier information of the mobile phone. The supermarket payment device forwards the information to the ALIPAY server after receiving the identity authentication information, and then the ALIPAY server generates the token corresponding to the identifier information of the mobile phone, and sends the generated token to the supermarket payment device.

According to the mobile payment method provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 3:
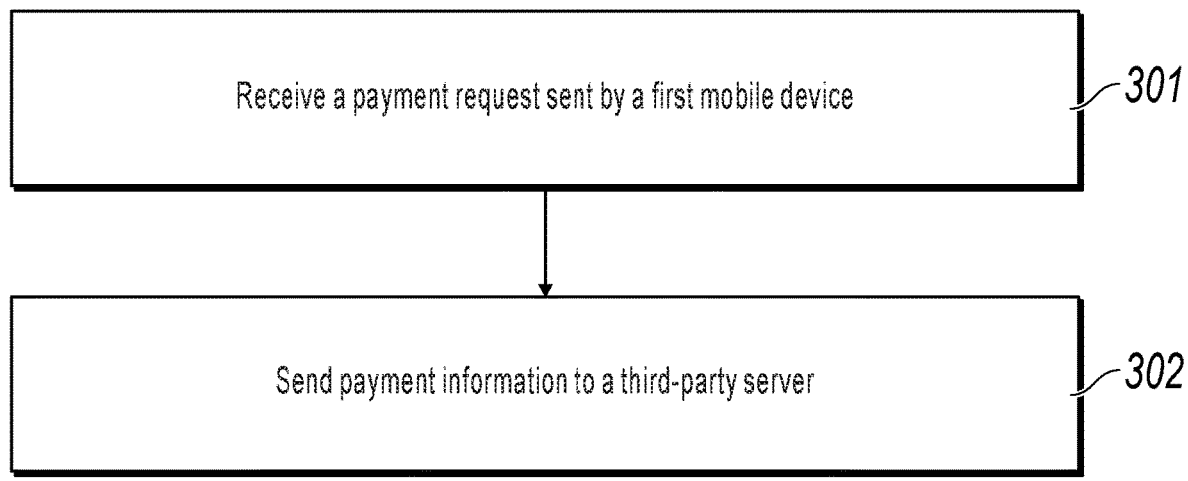
FIG. 3 is a flowchart illustrating still another mobile payment method, according to an implementation of the present disclosure.

An implementation of the present disclosure provides still another mobile payment method, and the method is applied to a second mobile device. As shown in FIG. 3, the method includes the following steps.

301. Receive a payment request sent by a first mobile device.

The payment request includes first mobile device identifier information, and no payment APP is installed in the first mobile device. The first mobile device can send the first mobile device identifier information to the second mobile device through Bluetooth, scanning, NFC, or other communications technologies, which is not limited in this implementation of the present disclosure. In this implementation of the present disclosure, the first mobile device sends the first mobile device identifier information to the second mobile device through Bluetooth, scanning, NFC, or other communications technologies, so that the first mobile device can perform a payment to the second mobile device without network access.

It is worthwhile to note that, the first mobile device and the second mobile device in the present disclosure are devices authenticated by the IFAA or the Authority by using a PKI system, that is, a certificate authenticated by using the previous method is stored in security zones of the first mobile device and the second mobile device, and the certificate is sent to a third-party server for identity authentication. The first mobile device identifier information is used to uniquely identify the first mobile device. The first mobile device identifier information can be a unique hardware code of the first mobile device or a certificate of the first mobile device, and is not limited in this implementation of the present disclosure.

In this implementation of the present disclosure, the second mobile device is a terminal with a device authorization function that has been authenticated, and identity authentication on the second mobile device is implemented by using the third-party server. The third-party server is a server corresponding to a third-party APP in the second mobile device. For example, an ALIPAY APP in the second mobile device can send payment information of the first mobile device to an ALIPAY server only after the ALIPAY server verifies that the second mobile device has the device authorization function. The third-party server can authenticate the second mobile device by using a device certificate of the second mobile device.

302. Send payment information to a third-party server.

The payment information includes the first mobile device identifier information, an account corresponding to a payment APP currently running in the second mobile device, and a payment amount corresponding to the first mobile device identifier information, so that the third-party server obtains account information corresponding to the first mobile device identifier information, and the payment amount can be transferred from an account corresponding to the first mobile device identifier information to the account corresponding to the payment APP currently running in the second mobile device.

In this implementation of the present disclosure, the first mobile device is a terminal with a device authorization function authenticated by the third-party server. Therefore, when the first mobile device performs a payment to the second mobile device, the first mobile device can first send the first mobile device identifier information to the second mobile device through Bluetooth, scanning, NFC, or other communications technologies, and then the second mobile device sends the payment information to the third-party server. The payment information includes the first mobile device identifier information, the account corresponding to the payment APP currently running in the second mobile device, and the payment amount corresponding to the first mobile device identifier information. The third-party server obtains the account information corresponding to the first mobile device identifier information after receiving the payment information, so that the payment amount can be transferred from the account corresponding to the first mobile device identifier information to the account corresponding to the payment APP currently running in the second mobile device. In the previously described process, it can be seen that the first mobile device only needs to send the first mobile device identifier information to the second mobile device when performing a payment to the second mobile device. Therefore, in this implementation of the present disclosure, the first mobile device can also perform mobile payment when no payment APP is installed in the first mobile device.

According to the mobile payment method provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 4:
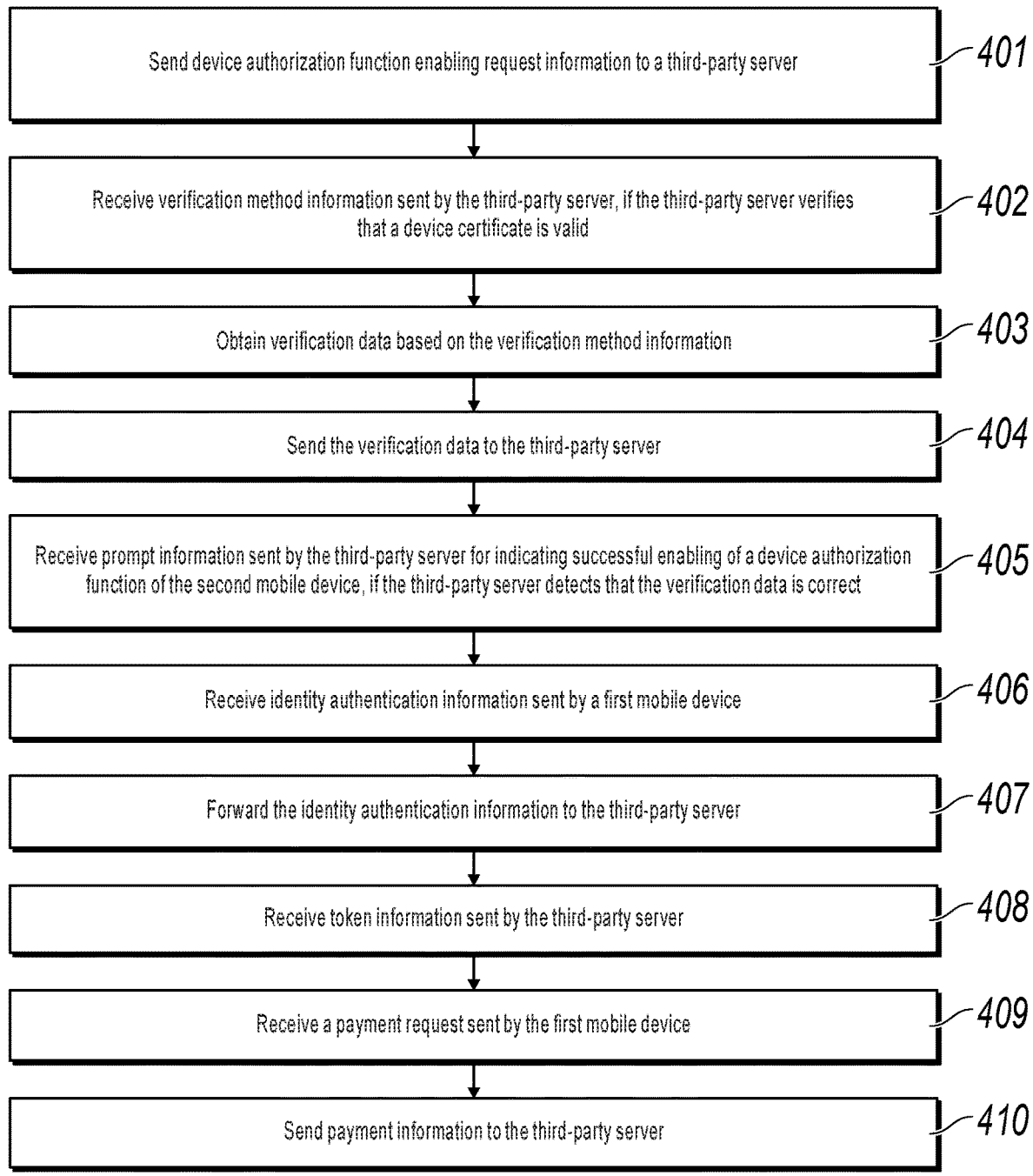
FIG. 4 is a flowchart illustrating yet another mobile payment method, according to an implementation of the present disclosure.

An implementation of the present disclosure provides yet another mobile payment method, and the method is applied to a second mobile device. As shown in FIG. 4, the method includes the following steps.

401. Send device authorization function enabling request information to a third-party server.

The device authorization function enabling request information includes a device certificate of the second mobile device, so that the third-party server verifies whether the device certificate is valid. It is worthwhile to note that the second mobile device is a device authenticated by the IFAA or the Authority by using a PKI system, that is, a certificate authenticated by using the previous method is stored in a security zone of the second mobile device, and the certificate is sent to the third-party server for identity authentication. In this implementation of the present disclosure, the device certificate of the second mobile device is a certificate stored in the security zone of the second mobile device.

402. Receive verification method information sent by the third-party server, if the third-party server verifies that a device certificate is valid.

The verification method information can be face verification, certificate verification, handwriting verification, voiceprint verification, eyeprint verification, etc, and is not limited in this implementation of the present disclosure.

403. Obtain verification data based on the verification method information.

For example, if the received verification method information is certificate verification and voiceprint verification, certificate verification prompt information and voiceprint verification prompt information are first output, and then certificate data and voice data input by a user of the second mobile device are received.

404. Send the verification data to the third-party server.

Further, the third-party server detects whether the verification data is correct.

405. Receive prompt information sent by the third-party server for indicating successful enabling of a device authorization function of the second mobile device, if the third-party server detects that the verification data is correct.

It is worthwhile to note that the second mobile device can send payment information to the third-party server only after the device authorization function of the second mobile device is enabled. In this implementation of the present disclosure, the prompt information indicating the successful enabling of the device authorization function of the second mobile device is used to notify the user of the second mobile device that the device authorization function of the current device has been enabled. In this case, the payment information can be sent to the third-party server by using the second mobile device.

406. Receive identity authentication information sent by a first mobile device.

The identity authentication information includes first mobile device identifier information, and no payment APP is installed in the first mobile device. The first mobile device identifier information can be a unique hardware code of the first mobile device, or a certificate of the first mobile device, and is not limited in this implementation of the present disclosure.

In this implementation of the present disclosure, the first mobile device can send the first mobile device identifier information to the second mobile device through Bluetooth, scanning, NFC, or other communications technologies, which is not limited in this implementation of the present disclosure. In this implementation of the present disclosure, the first mobile device sends the first mobile device identifier information to the second mobile device through Bluetooth, scanning, NFC, or other communications technologies, so that the first mobile device can perform a payment to the second mobile device without network access.

407. Forward the identity authentication information to the third-party server.

Further, the third-party server generates token information corresponding to the first mobile device identifier information. It is worthwhile to note that, the third-party server stores the token information only for a short time after generating the token information based on the first mobile device identifier information. For example, if the token information is generated at 14:00, and the token information can be stored in the third-party server for three minutes, token information generated after 14:03 is automatically deleted from the third-party server.

408. Receive token information sent by the third-party server.

409. Receive a payment request sent by the first mobile device.

The payment request includes the first mobile device identifier information.

410. Send payment information to the third-party server.

The payment information includes the first mobile device identifier information, an account corresponding to a payment APP currently running in the second mobile device, a payment amount corresponding to the first mobile device identifier information, the token information, and a device certificate of the first mobile device.

Further, the third-party server separately verifies whether the token information and the device certificate of the first mobile device are correct. The third-party server obtains account information corresponding to the first mobile device identifier information, if it is verified that both the token information and the device certificate of the first mobile device are correct, so that the payment amount can be transferred from an account corresponding to the first mobile device identifier information to the account corresponding to the payment APP currently running in the second mobile device. In this implementation of the present disclosure, the account information corresponding to the first mobile device identifier information is obtained when it is verified that both the token information and the device certificate of the first mobile device are correct, to ensure security of payment by the first mobile device.

According to the mobile payment method provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 5:
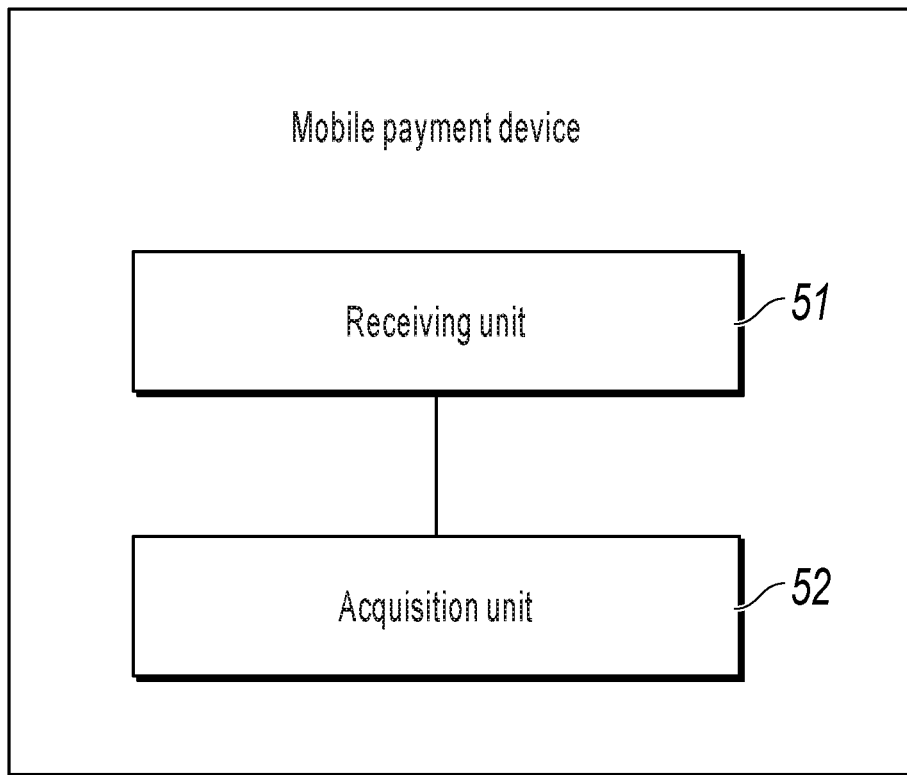
FIG. 5 is a block diagram illustrating a mobile payment device, according to an implementation of the present disclosure.

Further, an implementation of the present disclosure provides a mobile payment device. As shown in FIG. 5, the mobile payment device includes a receiving unit 51 and an acquisition unit 52. The receiving unit 51 is configured to receive payment information sent by a second mobile device, where the payment information includes first mobile device identifier information, an account corresponding to a payment APP currently running in the second mobile device, and a payment amount corresponding to the first mobile device identifier information; the first mobile device identifier information is sent by a first mobile device to the second mobile device, and no payment APP is installed in the first mobile device. The acquisition unit 52 is configured to obtain account information corresponding to the first mobile device identifier information, so that the payment amount can be transferred from an account corresponding to the first mobile device identifier information to the account corresponding to the payment APP currently running in the second mobile device.

It is worthwhile to note that reference can be made to the corresponding descriptions of the method shown in FIG. 1 for other corresponding descriptions of the functional units of the mobile payment device provided in this implementation of the present disclosure. Details are omitted here. However, it is worthwhile to note that the mobile payment device in this implementation can correspondingly implement all content in the previous method implementations.

According to the mobile payment device provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 6:
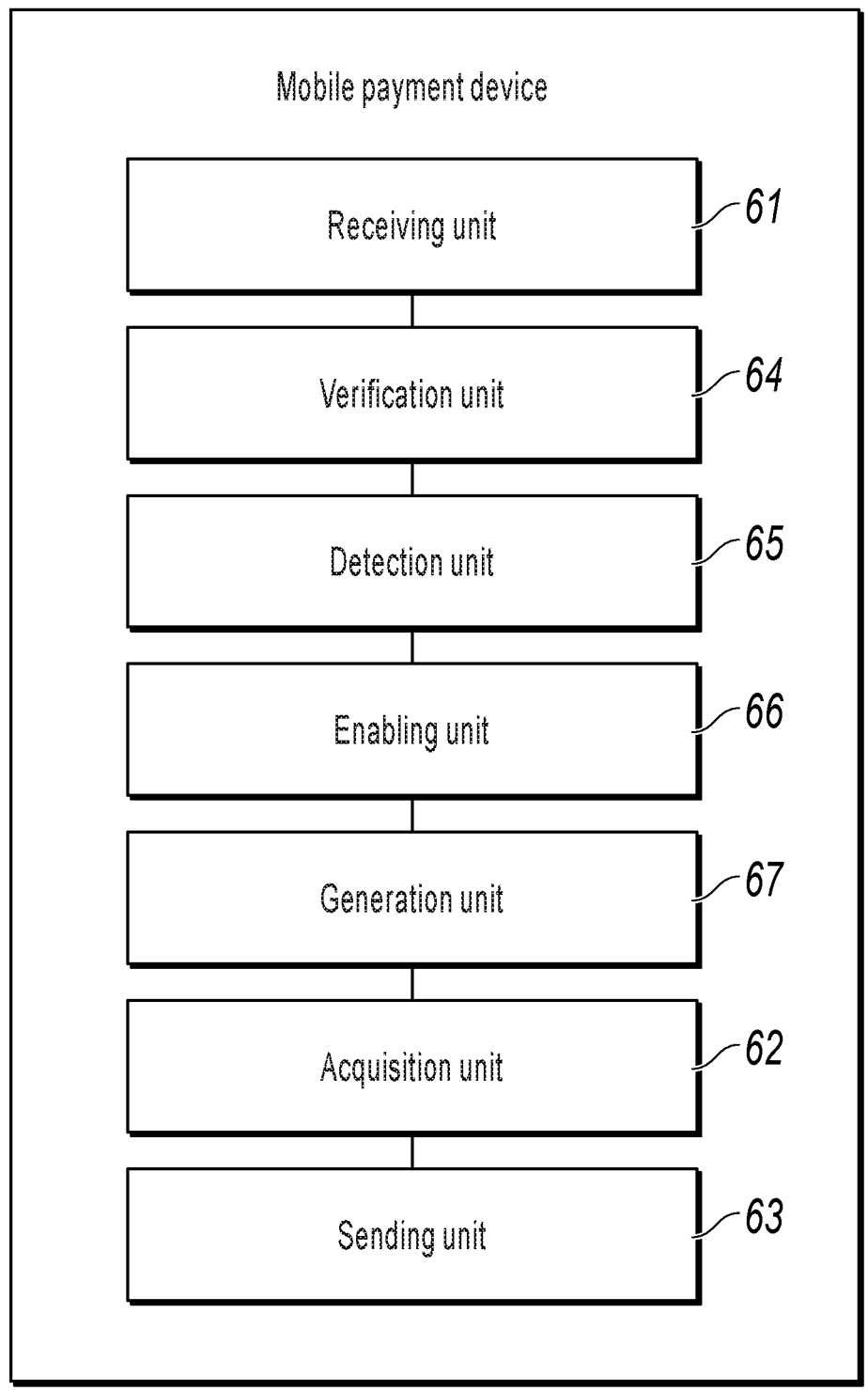
FIG. 6 is a block diagram illustrating another mobile payment device, according to an implementation of the present disclosure.

Further, an implementation of the present disclosure provides another mobile payment device. As shown in FIG. 6, the device mobile payment includes a receiving unit 61 and an acquisition unit 62. The receiving unit 61 is configured to receive payment information sent by a second mobile device, where the payment information includes first mobile device identifier information, an account corresponding to a payment APP currently running in the second mobile device, and a payment amount corresponding to the first mobile device identifier information; the first mobile device identifier information is sent by a first mobile device to the second mobile device, and no payment APP is installed in the first mobile device. The acquisition unit 62 is configured to obtain account information corresponding to the first mobile device identifier information, so that the payment amount can be transferred from an account corresponding to the first mobile device identifier information to the account corresponding to the payment APP currently running in the second mobile device.

Further, the mobile payment device further includes a verification unit 64 and a sending unit 63.

The receiving unit 61 is further configured to receive device authorization function enabling request information sent by the second mobile device, where the device authorization function enabling request information includes a device certificate of the second mobile device.

The verification unit 64 is configured to verify whether the device certificate is valid.

The sending unit 63 is configured to send verification method information to the second mobile device if the device certificate is valid, so that the second mobile device obtains verification data based on the verification method information.

Further, the mobile payment device further includes a detection unit 65 and an enabling unit 66.

The receiving unit 61 is further configured to receive the verification data sent by the second mobile device.

The detection unit 65 is configured to detect whether the verification data is correct.

The enabling unit 66 is configured to enable a device authorization function of the second mobile device if the verification data is correct.

The sending unit 63 is further configured to send enabling information of the second mobile device to the second mobile device, so that the second mobile device confirms the enabling information.

The acquisition unit 62 is further configured to obtain account credit information corresponding to the second mobile device, where the credit information is used to evaluate credit of the second mobile device.

The detection unit 65 is further configured to detect whether the account credit information corresponding to the second mobile device exceeds a predetermined threshold.

The sending unit 63 is configured to send the verification method information to the second mobile device, if the account credit information corresponding to the second mobile device exceeds the predetermined threshold.

The mobile payment device further includes a generation unit 67.

The receiving unit 61 is further configured to receive first mobile device identity authentication information sent by the second mobile device, where the first mobile device identity authentication information includes the first mobile device identifier information.

The generation unit 67 is configured to generate token information corresponding to the first mobile device identifier information.

The sending unit 63 is further configured to send the token information to the second mobile device.

In this implementation of the present disclosure, the payment information sent by the second mobile device further includes the token information and a device certificate of the first mobile device.

The verification unit 64 is further configured to separately verify whether the token information and the device certificate of the first mobile device are correct.

The acquisition unit 62 is configured to obtain the account information corresponding to the first mobile device identifier information, if both the token information and the device certificate of the first mobile device are correct.

The sending unit 63 is further configured to send identity authentication failure prompt information of the first mobile device to the second mobile device, if it is verified that either the token information or the device certificate of the first mobile device is incorrect.

It is worthwhile to note that reference can be made to the corresponding descriptions of the method shown in FIG. 2 for other corresponding descriptions of the functional units of the mobile payment device provided in this implementation of the present disclosure. Details are omitted here. However, it is worthwhile to note that the mobile payment device in this implementation can correspondingly implement all content in the previous method implementations.

According to the mobile payment device provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 7:
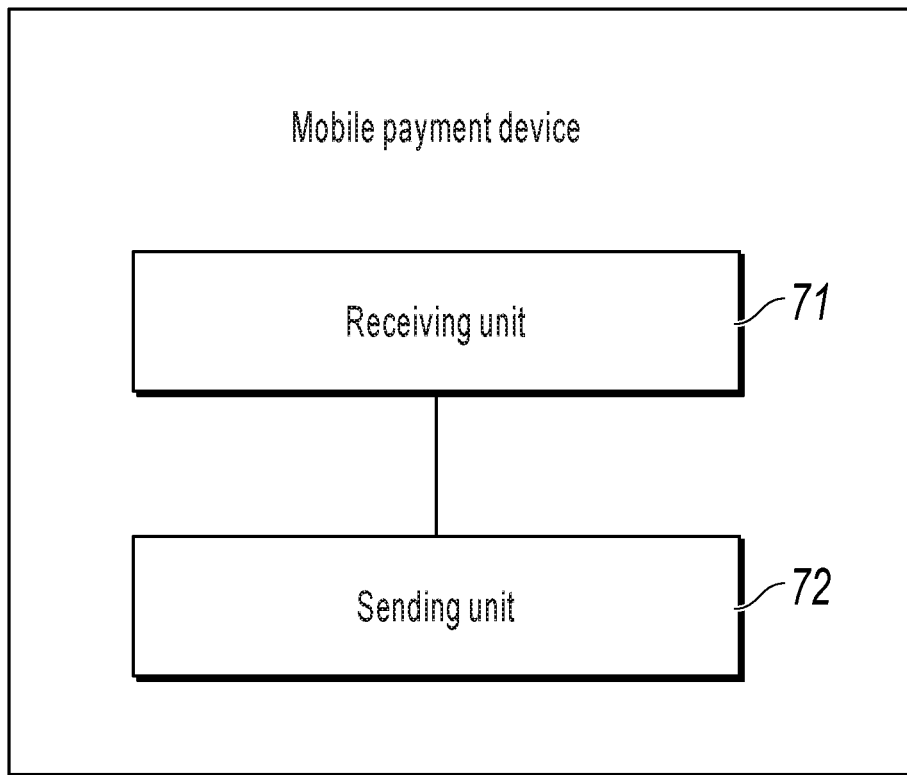
FIG. 7 is a block diagram illustrating still another mobile payment device, according to an implementation of the present disclosure.

Further, an implementation of the present disclosure provides still another mobile payment device. As shown in FIG. 7, the mobile payment device includes a receiving unit 71 and a sending unit 72.

The receiving unit 71 is configured to receive a payment request sent by a first mobile device, where the payment request includes first mobile device identifier information, and no payment APP is installed in the first mobile device.

The sending unit 72 is configured to send payment information to a third-party server, where the payment information includes the first mobile device identifier information, an account corresponding to a payment APP currently running in a second mobile device, and a payment amount corresponding to the first mobile device identifier information, so that the third-party server obtains account information corresponding to the first mobile device identifier information, and the payment amount can be transferred from an account corresponding to the first mobile device identifier information to the account corresponding to the payment APP currently running in the second mobile device.

It is worthwhile to note that reference can be made to the corresponding descriptions of the method shown in FIG. 3 for other corresponding descriptions of the functional units of the mobile payment device provided in this implementation of the present disclosure. Details are omitted here. However, it is worthwhile to note that the mobile payment device in this implementation can correspondingly implement all content in the previous method implementations.

According to the mobile payment device provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 8:
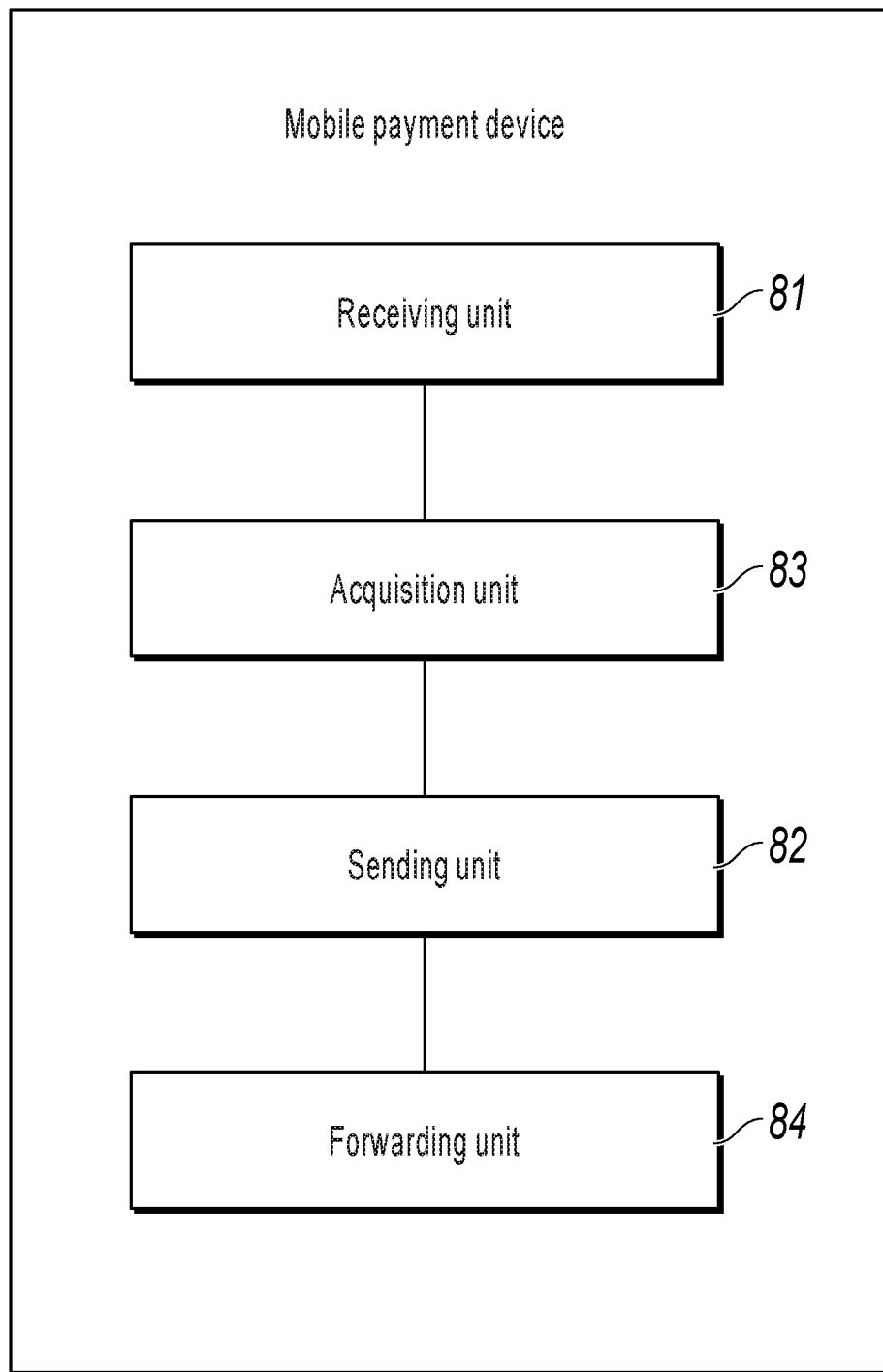
FIG. 8 is a block diagram illustrating yet another mobile payment device, according to an implementation of the present disclosure.

Further, an implementation of the present disclosure provides yet another mobile payment device. As shown in FIG. 8, the mobile payment device includes a receiving unit 81 and a sending unit 82.

The receiving unit 81 is configured to receive a payment request sent by a first mobile device, where the payment request includes first mobile device identifier information, and no payment APP is installed in the first mobile device.

The sending unit 82 is configured to send payment information to a third-party server, where the payment information includes the first mobile device identifier information, an account corresponding to a payment APP currently running in a second mobile device, and a payment amount corresponding to the first mobile device identifier information, so that the third-party server obtains account information corresponding to the first mobile device identifier information, and the payment amount can be transferred from an account corresponding to the first mobile device identifier information to the account corresponding to the payment APP currently running in the second mobile device.

Further, the mobile payment device further includes an acquisition unit 83.

The sending unit 82 is further configured to send device authorization function enabling request information to the third-party server, where the device authorization function enabling request information includes a device certificate of the second mobile device, so that the third-party server verifies whether the device certificate is valid.

The receiving unit 81 is further configured to receive verification method information sent by the third-party server, if the third-party server verifies that the device certificate is valid.

The acquisition unit 83 is configured to obtain verification data based on the verification method information.

The sending unit 82 is further configured to send the verification data to the third-party server, so that the third-party server detects whether the verification data is correct.

The receiving unit 81 is further configured to receive prompt information sent by the third-party server for indicating successful enabling of a device authorization function of the second mobile device, if the third-party server detects that the verification data is correct.

Further, the mobile payment device further includes a forwarding unit 84.

The receiving unit 81 is further configured to receive identity authentication information sent by the first mobile device, where the identity authentication information includes the first mobile device identifier information.

The forwarding unit 84 is configured to forward the identity authentication information to the third-party server, so that the third-party server generates token information corresponding to the first mobile device identifier information.

The receiving unit 81 is further configured to receive the token information sent by the third-party server.

In this implementation of the present disclosure, the payment information further includes the token information and a device certificate of the first mobile device, so that the third-party server separately verifies whether the token information and the device certificate of the first mobile device are correct.

It is worthwhile to note that reference can be made to the corresponding descriptions of the method shown in FIG. 4 for other corresponding descriptions of the functional units of the mobile payment device provided in this implementation of the present disclosure. Details are omitted here. However, it is worthwhile to note that the mobile payment device in this implementation can correspondingly implement all content in the previous method implementations.

According to the mobile payment device provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

Figure 9:
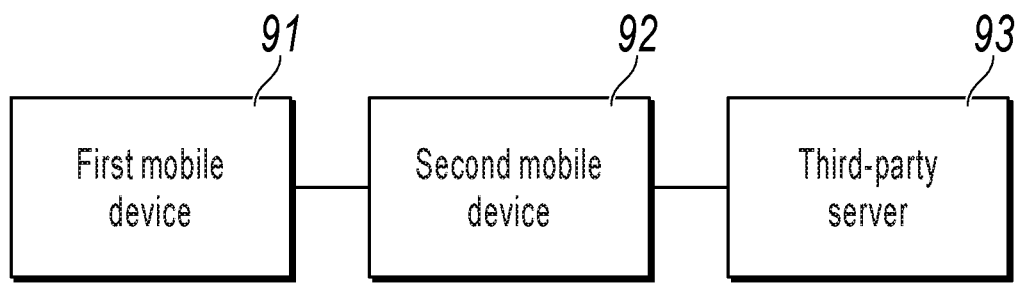
FIG. 9 is a structural block diagram illustrating a mobile payment system, according to an implementation of the present disclosure.

Further, an implementation of the present disclosure provides a mobile payment system. As shown in FIG. 9, the mobile payment system includes a first mobile device 91, a second mobile device 92, and a third-party server 93.

The first mobile device 91 is configured to send a payment request to the second mobile device, where the payment request includes first mobile device identifier information, and no payment APP is installed in the first mobile device.

The second mobile device 92 is configured to send payment information to the third-party server, where the payment information includes the first mobile device identifier information, an account corresponding to a payment APP currently running in the second mobile device, and a payment amount corresponding to the first mobile device identifier information.

The third-party server 93 is configured to obtain account information corresponding to the first mobile device identifier information, so that the payment amount can be transferred from an account corresponding to the first mobile device identifier information to the account corresponding to the payment APP currently running in the second mobile device.

According to the mobile payment system provided in this implementation of the present disclosure, the payment information sent by the second mobile device is first received, where the payment information includes the first mobile device identifier information, the account corresponding to the payment APP currently running in the second mobile device, and the payment amount corresponding to the first mobile device identifier information; and then the account information corresponding to the first mobile device identifier information is obtained, so that the payment amount can be transferred from the account corresponding to the first mobile device identifier information to the account corresponding to the payment APP currently running in the second mobile device. Compared with the existing technology in which mobile payment needs to be completed by installing a payment APP in a mobile device, in this implementation of the present disclosure, when the first mobile device needs to perform a payment to the second mobile device, the payment information of the first mobile device can be sent to the third-party server by using the second mobile device, where the payment information includes the first mobile device identifier information; and the third-party server obtains the account information corresponding to the first mobile device identifier information after receiving the payment information, so that the payment amount can be transferred from the account corresponding to the first mobile device identifier information to the account corresponding to the payment APP currently running in the second mobile device. As such, the first mobile device in this implementation of the present disclosure can also complete mobile payment when no payment APP is installed in the first mobile device.

The mobile payment device includes a processor and a memory. The previously described receiving unit, the acquisition unit, the sending unit, the verification unit, the detection unit, the enabling unit, the generation unit, etc. are stored in the memory as program units. The processor executes the program units stored in the memory to implement corresponding functions.

The processor includes a kernel, and the kernel invokes a corresponding program unit from the memory. There can be one or more kernels. The accuracy of displaying mixed views can be improved by adjusting kernel parameters.

The memory can include a non-persistent storage, a random access memory (RAM), and/or a nonvolatile memory in a computer readable medium, for example, a read-only memory (ROM) or a flash memory (flash RAM). The memory includes at least one storage chip.

The present application further provides a computer program product. When a data processing device executes the computer program product, program code for initialization includes the following method steps: receiving payment information sent by a second mobile device, where the payment information includes first mobile device identifier information, an account corresponding to a payment APP currently running in the second mobile device, and a payment amount corresponding to the first mobile device identifier information, the first mobile device identifier information is sent by a first mobile device to the second mobile device, and no payment APP is installed in the first mobile device; and obtaining account information corresponding to the first mobile device identifier information, so that the payment amount can be transferred from an account corresponding to the first mobile device identifier information to the account corresponding to the payment APP currently running in the second mobile device.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device, and the computer program product based on the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated-purpose computer, an embedded processor, or a processor of another programmable data processing device to generate a machine, so that the instructions executed by the computer or the processor of the another programmable data processing device generate an apparatus for implementing a specific function in one or more flows in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more flows in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more flows in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. An example of a computer storage medium includes but is not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a tape and disk storage or another magnetic storage device or any other non-transmission media that can be configured to store information that a computing device can access. As described in the present application, the computer readable medium does not include computer readable transitory media (transitory media) such as a modulated data signal and a carrier.

The previous descriptions are merely the implementations of the present application, but are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 11:
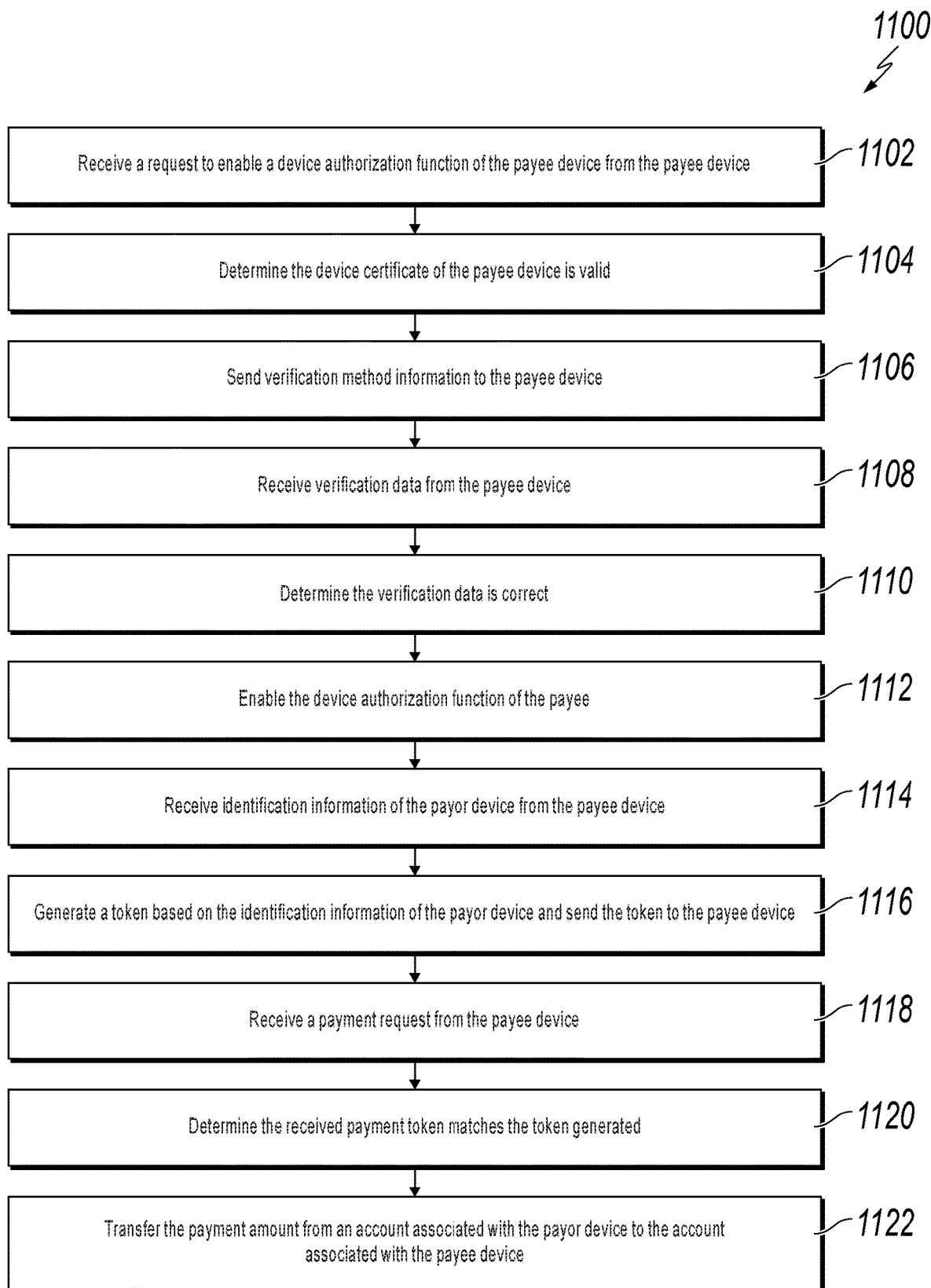
FIG. 11 is a flowchart illustrating an example of a computer-implemented method for processing payment between mobile devices, according to an implementation of the present disclosure.

FIG. 11 is a flowchart illustrating an example of a computer-implemented method 1100 for processing payments between mobile devices, according to an implementation of the present disclosure. For clarity of presentation, the description that follows generally describes method 1100 in the context of the other figures in this description. However, it will be understood that method 1100 can be performed, for example, by any system, environment, software, and hardware, or a combination of systems, environments, software, and hardware, as appropriate. In some implementations, various steps of method 1100 can be run in parallel, in combination, in loops, or in any order.

At 1102, a payee device (the second device described above) enables a device authorization function using a third-party server. In some cases, enabling the device authorization function at the payee device includes sending, by the payee device, a request to enable a device authorization function to a third-party server, wherein the request includes a device certificate of the payee device; receiving, by the payee device, verification method information from the third-party server after the third-party server verifies the payee device; obtaining, by the payee device, verification data based on the verification method information from a user of the payee device; sending, by the payee device, the verification data to the third-party server; and receiving, by the payee device, a confirmation from the third-party sever indicating the device authorization function of the payee device has been enabled if the third-party server determines the verification data is correct.

At 1104, the payee device receives identity authentication information from a payor device (the first device described above), wherein the identity authentication information includes an identifier of the payor device, and wherein the payor device does not have a payment application (APP) installed.

At 1006, in response to receiving the identity authentication information, the payee device forwards the received identity authentication information to the third-party server.

At 1108, the payee device receives token information from the third-party server, wherein the token information is generated by the third-party server and corresponds to the identifier of the payor device.

At 1110, the payee device receives a payment request from the payor device, wherein the payment request includes the identifier of the payor device and the generated token.

At 1112, in responsive to receiving the payment request, the payee device sends payment information including the generated token and the to the third-party server for verification. In some cases, the payment information includes the identifier of the payor device, an account corresponding to a payment APP running on the payee device, a payment amount corresponding to the identifier, the token information, and a device certificate of the payor device.

In some cases, the method 1100 includes verifying the payee device by determining whether a corresponding device certificate exists in the third-party server.

In some implementations, account credit information is obtained corresponding to the payee device; and a determination is made whether the account credit information corresponding to the payee device exceeds a predetermined threshold. In some cases, the token information and the device certificate of the payor device are verified by determining whether the corresponding token information and the device certificate of the payor device exist in the third-party server. in response to verifying, obtaining account information corresponding to the identifier of the payor device can be obtained from the third-party server; and the payment amount can be transferred from an account corresponding to the identifier of the payor device to the account corresponding to the payment APP running on the payee device. In some implementations, if the account information is not found in the third-party server, prompt information is sent to the payee device to prompt a user of the payor device to provide corresponding account information.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for processing a payment between a payor device and a payee device comprising:
    determining that a secure zone of the payee device does not have a device certificate of the payee device;
    in response to determining that the secure zone of the payee device does not have the device certificate of the payee device, storing, by the payee device and in the secure zone of the payee device, the device certificate of the payee device, wherein the device certificate of the payee device is authenticated using a public key infrastructure (PKI) system;
    enabling, by the payee device, a device authorization function using a third-party server, wherein the enabling comprises sending, by the payee device to the third-party server, a request comprising the device certificate of the payee device;
    initiating, by the payee device, a short-range communication between the payee device and the payor device in accordance with a short-range communication protocol;
    receiving, by the payee device, identity authentication information from the payor device, wherein the identity authentication information includes an identifier of the payor device;
    in response to receiving the identity authentication information, forwarding, by the payee device, the identity authentication information to the third-party server;
    receiving, by the payee device, token information from the third-party server without the token information passing through the payor device, wherein the token information is generated by the third-party server and corresponds to the identifier of the payor device;
    receiving, by the payee device, a payment request from the payor device, wherein the payment request includes the identifier of the payor device;
    in response to receiving the payment request, sending, by the payee device, payment information including the token information and the identifier of the payor device to the third-party server for verification, wherein the identifier of the payor device comprises a unique hardware code of the payor device; and
    receiving, by the payee device from the third-party server, a message indicating the payment processing between the payor device and the payee device is completed.

2. The computer-implemented method of claim 1, wherein enabling, by the payee device, the device authorization function using the third-party server further comprises:
    receiving, by the payee device, verification method information from the third-party server after the third-party server verifies the payee device;
    obtaining, by the payee device, verification data based on the verification method information from a user of the payee device;
    sending, by the payee device, the verification data to the third-party server; and
    receiving, by the payee device, a confirmation from the third-party server indicating the device authorization function of the payee device has been enabled after the third-party server determines the verification data is correct.

3. The computer-implemented method of claim 1, wherein the payment information includes the identifier of the payor device, an account corresponding to a payment APP running on the payee device, a payment amount corresponding to the identifier, the token information, and a device certificate of the payor device.

4. A non-transitory computer-readable storage medium of a payee device coupled to one or more computers and configured with instructions executable by the one or more computers to process a payment between a payor device and the payee device, the instructions comprise:
    determining that a secure zone of the payee device does not have a device certificate of the payee device;
    in response to determining that the secure zone of the payee device does not have the device certificate of the payee device, storing, by the payee device and in the secure zone of the payee device, the device certificate of the payee device, wherein the device certificate of the payee device is authenticated using a public key infrastructure (PKI) system;
    enabling, by the payee device, a device authorization function using a third-party server, wherein the enabling comprises sending, by the payee device to the third-party server, a request comprising the device certificate of the payee device;
    initiating, by the payee device, a short-range communication between the payee device and the payor device in accordance with a short-range communication protocol;
    receiving, by the payee device, identity authentication information from the payor device, wherein the identity authentication information includes an identifier of the payor device;
    in response to receiving the identity authentication information, forwarding, by the payee device, the identity authentication information to the third-party server;
    receiving, by the payee device, token information from the third-party server without the token information passing through the payor device, wherein the token information is generated by the third-party server and corresponds to the identifier of the payor device;
    receiving, by the payee device, a payment request from the payor device, wherein the payment request includes the identifier of the payor device;
    in response to receiving the payment request, sending, by the payee device, payment information including the token information and the identifier of the payor device to the third-party server for verification, wherein the identifier of the payor device comprises a unique hardware code of the payor device; and
    receiving, by the payee device from the third-party server, a message indicating the payment processing between the payor device and the payee device is completed.

5. The non-transitory computer-readable storage medium of claim 4, wherein enabling, by the payee device, the device authorization function using the third-party server further comprises:
    receiving, by the payee device, verification method information from the third-party server after the third-party server verifies the payee device;
    obtaining, by the payee device, verification data based on the verification method information from a user of the payee device;
    sending, by the payee device, the verification data to the third-party server; and
    receiving, by the payee device, a confirmation from the third-party server indicating the device authorization function of the payee device has been enabled after the third-party server determines the verification data is correct.

6. The non-transitory computer-readable storage medium of claim 4, wherein the payment information includes the identifier of the payor device, an account corresponding to a payment APP running on the payee device, a payment amount corresponding to the identifier, the token information, and a device certificate of the payor device.

7. A system of a payee device, comprising:
one or more computers; and
one or more computer-readable memories coupled to the one or more computers and configured with instructions executable by the one or more computers to process a payment between a payor device and the payee device, the instructions comprise:
determining that a secure zone of the payee device does not have a device certificate of the payee device;
in response to determining that the secure zone of the payee device does not have the device certificate of the payee device, storing, by the payee device and in the secure zone of the payee device, the device certificate of the payee device, wherein the device certificate of the payee device is authenticated using a public key infrastructure (PKI) system;
enabling, by the payee device, a device authorization function using a third-party server, wherein the enabling comprises sending, by the payee device to the third-party server, a request comprising the device certificate of the payee device;
initiating, by the payee device, a short-range communication between the payee device and the payor device in accordance with a short-range communication protocol;
receiving, by the payee device, identity authentication information from the payor device, wherein the identity authentication information includes an identifier of the payor device;
in response to receiving the identity authentication information, forwarding, by the payee device, the identity authentication information to the third-party server;

receiving, by the payee device, token information from the third-party server without the token information passing through the payor device, wherein the token information is generated by the third-party server and corresponds to the identifier of the payor device;
receiving, by the payee device, a payment request from the payor device, wherein the payment request includes the identifier of the payor device;
in response to receiving the payment request, sending, by the payee device, payment information including the token information and the identifier of the payor device to the third-party server for verification, wherein the identifier of the payor device comprises a unique hardware code of the payor device; and
receiving, by the payee device from the third-party server, a message indicating the payment processing between the payor device and the payee device is completed.

8. The system of claim 7, wherein enabling, by the payee device, the device authorization function using the third-party server further comprises:
receiving, by the payee device, verification method information from the third-party server after the third-party server verifies the payee device;
obtaining, by the payee device, verification data based on the verification method information from a user of the payee device;
sending, by the payee device, the verification data to the third-party server; and
receiving, by the payee device, a confirmation from the third-party server indicating the device authorization function of the payee device has been enabled after the third-party server determines the verification data is correct.

9. The system of claim 7, wherein the payment information includes the identifier of the payor device, an account corresponding to a payment APP running on the payee device, a payment amount corresponding to the identifier, the token information, and a device certificate of the payor device.

* * * * *

UNITED STATES PATENT AND TRADEMARK OFFICE
CERTIFICATE OF CORRECTION

PATENT NO. : 11,100,474 B2  Page 1 of 1
APPLICATION NO. : 16/725913
DATED : August 24, 2021
INVENTOR(S) : Yuanbo Sun It is certified that error appears in the above-identified patent and that said Letters Patent is hereby corrected as shown below:

On the Title Page

Page 2, Line 2, Column 1 item (57), (abstract), delete "to the third-party" and insert -- third-party --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*